United States Patent [19]

Morrisey

[11] 3,841,197
[45] Oct. 15, 1974

[54] FOAM STRUCTURED ROCKET DISPENSER

[75] Inventor: Edward J. Morrisey, Dayton, Ohio

[73] Assignee: The United States of America as represented by the Secretary of the Air Force, Washington, D.C.

[22] Filed: Dec. 13, 1972

[21] Appl. No.: 314,621

[52] U.S. Cl. ............................. 89/1.816, 89/1.817
[51] Int. Cl. ................................................ F41f 3/04
[58] Field of Search .............. 89/1.8, 1.816, 1.817

[56] References Cited
UNITED STATES PATENTS

| | | | |
|---|---|---|---|
| 2,792,962 | 5/1957 | Granfelt | 89/1.817 |
| 2,844,073 | 7/1958 | Re et al. | 89/1.817 |
| 2,956,478 | 10/1960 | Ream, Jr. et al. | 89/1.816 X |
| 3,048,086 | 8/1962 | Robert et al. | 89/1.817 |
| 3,315,565 | 3/1967 | Nash | 89/1.816 |
| 3,319,522 | 5/1967 | Gould et al. | 89/1.815 X |
| 3,342,104 | 9/1967 | Robert | 89/1.817 |
| 3,500,717 | 3/1970 | Sautier | 89/1.817 |
| 3,710,678 | 1/1973 | Abelin et al. | 89/1.817 X |

FOREIGN PATENTS OR APPLICATIONS

| | | | |
|---|---|---|---|
| 578,034 | 6/1959 | Great Britain | 89/1.817 |

*Primary Examiner*—Samuel W. Engle
*Attorney, Agent, or Firm*—Harry A. Herbert, Jr.; Arthur R. Parker

[57] ABSTRACT

A rocket dispensing pod structure including a urethane foam enclosing a cluster of rocket launcher-tubes and wrapped in a reinforcing, outer skin cover composed of glass, graphite or other high modulus fibers covered with epoxy, polyester or other suitable resin.

2 Claims, 5 Drawing Figures

FOAM STRUCTURED ROCKET DISPENSER

BACKGROUND OF THE INVENTION

This invention relates generally to rocket dispensers or pods that are suspended or otherwise mounted to the wings or fuselage of helicopters and other aircraft and each of which contain a cluster of individual rocket tubes.

The above-referred to rocket dispensers or pods are generally made from a welded or riveted metal construction which normally incorporates an extremely thin metal covering or skin that is, in practice, rather easily damaged. Also, under conditions of severe vibration, the welded or riveted points thereof are a focus for high stress.

The unique pod construction of the present invention, to be hereinafter described in detail in the following description thereof, solves or at least drastically alleviates the aforementioned problems of currently-used rocket launcher tube-pods by providing a new and novel, and yet simplified pod construction that is less easily damaged and more vibration resistant.

SUMMARY OF THE INVENTION

This invention resides briefly in an improved rocket dispenser that consists of a pod structure having, for the express purpose of its fabrication, a pair of spaced-apart disk members for supporting opposite end portions of a cluster of rocket tubes, a first, main inner and relatively thick tube-enclosing, urethane foam surrounding, and supporting and insulating the disk-held cluster of rocket tubes, and a second, outer, relatively thin and reinforcing skin covering uniquely composed of a combination of glass, graphite or other high modulus fibers and epoxy, polyester or other resin fibers wrapped, in novel manner, around, and bonded to the urethane foam in both hoop and helical patterns.

Inherent objects and advantages of the above-outlined new and novel rocket dispenser-pod structure of the present invention will become self-evident hereinbelow in the following detailed description, taken in connection with the accompanying drawings, in which:

DESCRIPTION OF THE PREFERRED EMBODIMENT

Figure 1:
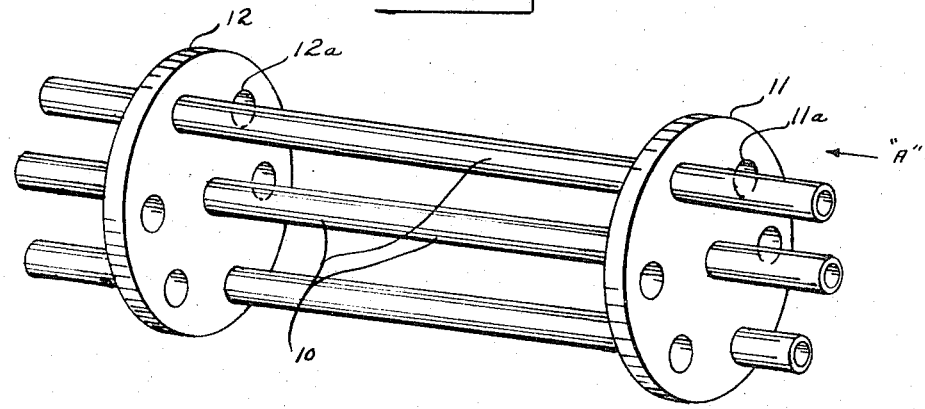
FIG. 1 is a schematic, perspective and partly fabricated view, illustrating the initial step involved in the formation of the new and improved rocket launcher tube-pod of the present invention, in which the opposite end portions of each of the tube cluster being mounted are shown extending through corresponding openings in a pair of oppositely-disposed, tube-receiving-and-supporting disk members or spacer elements.
Figure 1A:
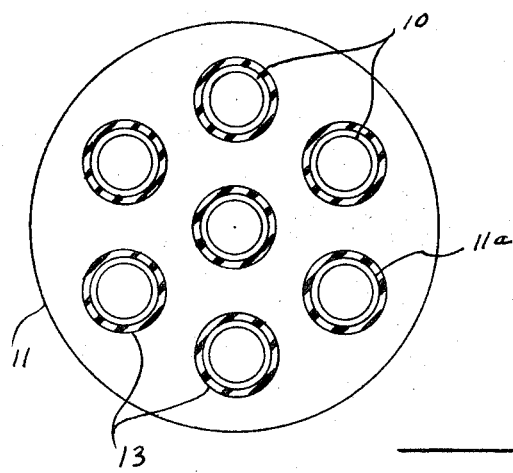
FIG. 1a is an enlarged fragmentary and partly schematic view, looking in the direction of the arrow "A" in FIG. 1, and illustrating one of the spacer elements of the invention with certain details of the resilient and/or cushioned mounting means formed between each of the spacer element-openings and a corresponding rocket tube.

Referring generally to the drawings and, in particular, to FIG. 1, a cluster of metal rocket tubes to be encased in the unique rocket launcher tube-pod of the present invention are indicated generally at 10 as being positioned and thereby restrained in their correct spaced-apart and parallel relation preferably by means of the use of a pair of spaced-apart, tube-receiving-and-supporting and disk-shaped, spacer elements at 11 and 12. As is clearly depicted in the aforesaid FIG. 1, the opposite ends or end portions of each of said plurality of rocket tubes 10 are extended in overlapping relation through a corresponding pair of aligned openings, as at 11a and 12a, respectively formed in each of the said pair of spacer elements 11 and 12. Although, in FIG. 1, only three tubes 10 have been illustrated for the sake of clarity; in the example shown, there are actually openings in each spacer element 11, 12 for a total of seven such rocket launcher-tubes. Naturally, the actual number of tubes would vary, in practice, with the particular application. Each of the rocket launcher tubes 10 may be sealed and resiliently mounted in a corresponding pair of openings in the aforesaid spacer elements 11 and 12 either by means of the application of a room temperature vulcanizing rubber or silicone rubber into the space between the respective opening and the circumference of the respective tube 10, or, alternatively, simply by the application in each of the said openings of an appropriately-sized grommet suitably cut, for example, from a rubber sheet. In either case, the end result provides what is, in effect, a rubber insert, as indicated for example at 13 in FIG. 1a, between the respective tube 10 and the opening, as at 11a, for the spacer element, as at 11 in the aforementioned FIG. 1a. In this connection, it is noted that the spacer elements 11 and 12 may be made of either plywood or sheet metal, as desired.

Figure 2:
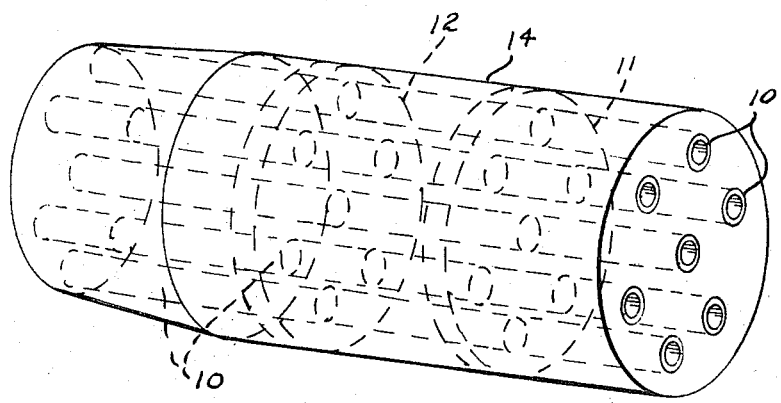
FIG. 2 is another partly schematic and perspective view, illustrating details of the substantially assembled or fabricated form of the inventive rocket launcher tube-pod after the second step has been completed; namely, after the partly assembled inventive form of FIG. 1 has been encased or enclosed within the unique urethane form structure of the present invention.

After having installed or assembled the plurality of rocket tubes 10 (FIG. 1) in a sealed and somewhat cushioned relation in the respective openings 11a, 12a of the spacer elements 11 and 12, with, of course, the use of the rubber inserts, as at 13, which actually may be considered as constituting the first step involved in the fabrication of the invention, the unique urethane foam, consisting of the key feature of the present invention, and indicated generally and schematically at the reference numeral 14 in FIG. 2, may then be positioned in a cylindrical configuration in surrounding and completely enclosing relation around both spacer elements 11 and 12 and the plurality of rocket launcher-tubes 10. The said spacer elements 11, 12 may be left in position, if desired, because the urethane foam 14 now becomes the principal loadcarrying and also insulative structure of the inventive pod. In this regard, the urethane foam 14 is preferably selected from a semi-rigid type of foam of from 2–6 *pcf* depending on individual and total rocket weight.

Figure 3:
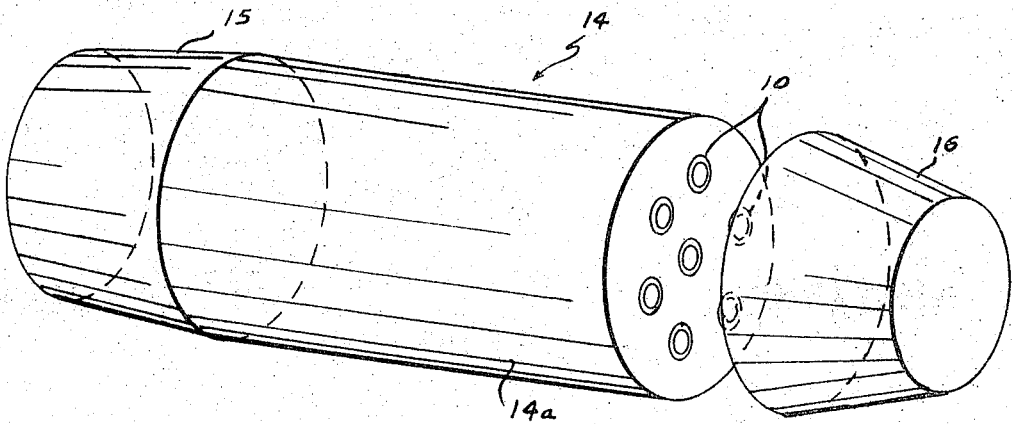
FIG. 3 represents still another partly schematic and perspective view, depicting an aerodynamic configuration into which the inventive pod structure of FIG. 2 may be shaped as the third step involved in forming an airborne rocket launcher tube-pod structure.

The next, or, in other words, third step (considering the initial installation of the rocket tubes within the supporting spacer elements 11 and 12 and the application of the urethane foam 14 therearound as the first two steps) is concerned with positioning or mounting the combined foam/tube structure on an appropriate lathe to thereby develop, by machining, the aerodynamic shape illustrated again generally at 14 in FIG. 3 for the airborne version of the present invention. Aerodynamically-shaped, urethane foam structure 14 of the inventive pod structure 14 incorporates a main urethane foam-body portion 14a, a first streamlined and machined foam aft end portion, at 15, that may constitute an integral part of the body portion 14a, and a second, streamlined and separable nose end-piece at 16. In addition to being a separate element to naturally provide for the installation of a plurality of rockets in the tubes 10, the nose end-piece 16 may be easily made frangible in form by the use of any of a number of alreadydeveloped and well-known means, so that it is naturally retained on the nose or forward end of the inventive rocket launcher tubepod during flight and is easily and automatically separated from the main body portion 14a when the rockets being retained in the tubes 10 are launched therefrom.

The use of the urethane foam 14 in the novel manner and combination of the present invention to encase the cluster of rocket tubes 10 provides a uniquely improved rocket launcher tube-pod structure for the reasons that it completely surrounds the enclosed tubes 10 throughout their entire length and therefore ensures the holding and supporting of the said tubes over their maximum surface area. This accomplishes the two-fold functions and advantages of both eliminating the localized stress points of welded or riveted pod structures and, in addition, contributes to a much greater insulation between the respective tubes in the cluster configuration than is the case with the "dead-air" space inherent in the other types of pod constructions.

Figure 4:
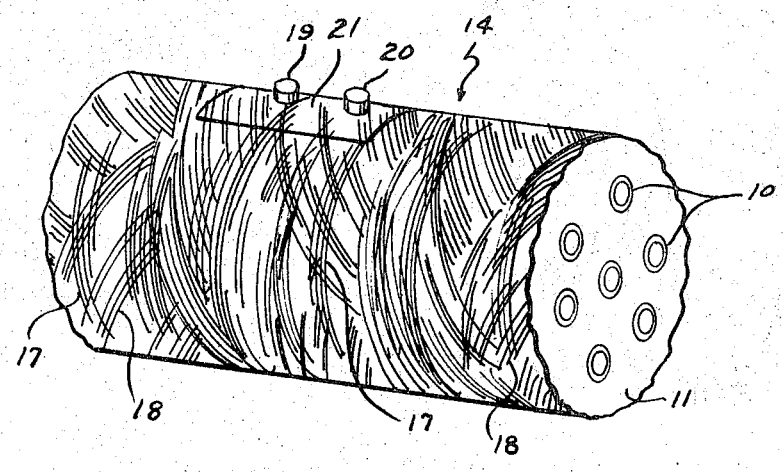
FIG. 4 is yet another perspective view, showing in schematic and partly broken-away form the unique hoop and helical windings used as an integral part of the present invention in forming a reinforcing outer covering or skin around the urethane foam structure of FIG. 2.

The unique urethane foam structure 14, as applied in the present invention in surrounding relation to the cluster of tubes 10, provides per se a structure of improved strength by the aforementioned elimination of local stress points, since it encases and supports the metal rocket tubes 10 over their entire exterior surface, as noted hereinbefore, which feature allows and assures the optimum load distribution. However, to reinforce, and thus generally strengthen the urethane foam 14, previously applied to, and around the plurality of rocket tubes 10, particularly by stiffening the outer surface thereof, the latter may incorporate a relatively thin, outer covering or skin composed of glass, graphite or other high modulus fibers that have been prepared as by covering or wetting with epoxy, polyester or other suitable resin and then applied by filament winding around the said outer surface of the urethane foam 14 in unique alternate hoop or circumferential and helical winding patterns, depicted schematically and respectively at 17 and 18 in FIG. 4. In one such configuration, the total winding patterns may consist of three hoop or circular winding layers alternated with two helical winding layers. Also, other foam systems such as polyimides and silicone, or polyimide resins could be used to provide a more heat resistant pod structure for applications on supersonic aircraft. However, the previously-described combined urethane foam 14 and resin covered-glass, graphite or other high modulus fiber-outer skin provides successful insulation to the plurality of rocket tubes 10 being supported thereby, for the lower velocity ranges. In either event, with the aforementioned outer skin-fibers oriented around and throughout the entire length of the urethane foam 14, the pod structure of the present invention not only has the inherent advantage of having its outer surface stiffened and therefore strengthened against externally-applied damage but, in addition, the novel use of the combined hoop and helical winding patterns 17 and 18 forming the outer skin covering thereof inherently assures the proper distribution of operational loads along the entire foam/pod structure and into the sites of the supporting lugs, as schematically represented at the reference numerals 19 and 20 in the reference numerals 19 and 20 in the aforementioned FIG. 4, which supporting lugs 19, 20 provide for the attachment of the pod to the aircraft. Provision at the said lug sites for the aforementioned load distribution may be by means of a metal hard back structure, indicated generally at 21, which may be made either of conventional extruded aluminum shapes or by means of filament wound rings such as are used for fuel tanks. In either event, the supporting lugs 19 and 20 and metal hard back structure 21 would be incorporated directly on, or within the urethane foam 14 before the winding thereon of the previously-noted outer cover or skin composed of the hoop and helical fiber windings 17 and 18. With the subsequent application of the latter outer skin, the metal hard back structure 21 is, of course, completely covered and a smooth aerodynamic surface is developed, except for the relatively minor interference of the supporting lugs 19 and 20 projecting upwardly therefrom.

Thus, a new and considerably improved and yet simplified rocket launcher tube-pod structure has been developed by the present invention whereby a cluster of rocket tubes are surrounded and completely enclosed by a semi-rigid urethane foam 14 that ensures the elimination of local stress points, increased resistance to vibration, the optimum distribution of load over the entire pod structure and improved insulation between launcher tubes that is particularly effective in the event of a misfire. Moreover, the present urethane foam/pod structure is uniquely reinforced by an outer cover or skin that strengthens and stiffens the outer surface thereof and is composed of high modulus fibers covered or wetted with resin and wound around the urethane foam in both hoop and helical patterns respectively disposed to distribute loads along the entire pod structure and into the sites of the supporting lugs that attach the pod structure to the aircraft.

I claim:

1. A rocket launcher tube-pod structure including a plurality of separate rocket tubes disposed in a predetermined cluster configuration; a pair of relatively lightweight, substantially non-loadsupporting and initially unsupported, oppositely-disposed, and rigid rube-support and disc-shaped spacer elements, each incorporating a plurality of regularly-spaced and transversely-extending openings in respective alignment with each other and receiving therethrough in partially supporting relation only the opposite end portions of, and thereby providing limited dualend support for initially and only temporarily positioning the said plurality of rocket tubes in preparation for their subsequent and permanent disposition in the said predetermined cluster configuration; a relatively thick, relatively lightweight, load-supporting, single, unitary and semi-rigid, combined, main tube-and-pod structure-and-insulative support therefor entirely composed of an insulating foam material and disposed as a combined supporting and foam insulating means completely around and thus reinforcing the partial support being initially given to the said tubes by said spacer elements, and further completely enclosing and entirely surrounding each of said plurality of rocket tubes and the spaces normally existing therebetween along the entire length thereof to thereby provide a main foam material-tube-support and pod structure ensuring both the protection of the said plurality of rocket tubes from the formation of local stress points therewithin by providing for the optimum load distribution throughout the entire pod structure, and improved insulation between individual rocket tubes in the event of the premature and/or accidental ignition of a particular rocket; a relatively thin, relatively rigid and separate reinforcing skin cover disposed in circumferential and contacting relation to and around the complete outer periphery of, and thereby both further reinforcing the inherent strength afforded to the pod structure by the said insulating foam material of the said combined, main tube-and-pod structure-and-insulative-support, and the protection thereof from externally-applied damage; and means for bonding said separate reinforcing skin cover to the outer periphery of the said insulating foam material forming the said combined, main tube-and-pod structure-and-insulative-support; said separate reinforcing skin cover comprising multiple layers of high modulus fibers filament wound completely around and throughout the entire length of the combined, main tube-and-pod structure-and-insulative support in separate and alternate layers of hoop and helical windings for ensuring a more uniform load distribution throughout the said pod structure into supporting lug sites provided therefor; the insulating foam material of said combined, main tube-and-pod structure-and-insulative support being disposed in holding and supporting relation along and completely housing the entire length of said plurality of rocket tubes, thus distributing operational loads over the maximum surface area thereof to both eliminate localized stress points and improve the insulation thereof.

2. A rocket launcher tube-pod structure as in claim 1, wherein said relatively thick, relatively lightweight, load-supporting and semi-rigid combined, main tube-and-pod structure-and-insulative support comprises a urethane foam material.

* * * * *